US011297511B1

(12) United States Patent
Neeli et al.

(10) Patent No.: US 11,297,511 B1
(45) Date of Patent: Apr. 5, 2022

(54) AI-DFS (ARTIFICIAL INTELLIGENCE ENABLED DYNAMIC FREQUENCY SELECTION) FOR STEERING DOWNGRADED WIRELESS STATIONS ON 160 MHZ BANDWIDTH SUPPORTED WIRELESS DATA COMMUNICATION NETWORKS

(71) Applicant: Fortinet, Inc., Sunnyvale, CA (US)

(72) Inventors: Srinivasa Subbarao Neeli, Bangalore (IN); Sudheer Nagurla, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 16 days.

(21) Appl. No.: 17/019,331

(22) Filed: Sep. 13, 2020

(51) Int. Cl.
*H04W 16/14* (2009.01)
*H04W 72/04* (2009.01)
*H04W 76/14* (2018.01)
*H04W 84/12* (2009.01)

(52) U.S. Cl.
CPC ....... *H04W 16/14* (2013.01); *H04W 72/0453* (2013.01); *H04W 76/14* (2018.02); *H04W 84/12* (2013.01)

(58) Field of Classification Search
CPC . H04W 16/14; H04W 72/0453; H04W 76/14; H04W 84/12
See application file for complete search history.

(56) References Cited

U.S. PATENT DOCUMENTS

| 2016/0073403 | A1* | 3/2016 | Kloper | H04L 1/00 370/329 |
| 2019/0341811 | A1* | 11/2019 | Elliott | H02J 50/80 |
| 2020/0288353 | A1* | 9/2020 | Kulkarni | H04W 28/18 |

* cited by examiner

*Primary Examiner* — Mohammad S Anwar
(74) *Attorney, Agent, or Firm* — Law Office Of Dorian Cartwright; Dorian Cartwright

(57) ABSTRACT

A station with a 160 MHz channel connection at a first access point is downgraded by an access point in response to being displaced off of a channel status changing to NOP (non occupancy period). This can be caused by ambient radar signals. The downgrade is addressed by redistributing the 160 MHz stations to other access points with available 160 MHz channels. Stations are steered to a network-wide best available bandwidth channel across different access points.

10 Claims, 6 Drawing Sheets

AI-DFS (ARTIFICIAL INTELLIGENCE ENABLED DYNAMIC FREQUENCY SELECTION) FOR STEERING DOWNGRADED WIRELESS STATIONS ON 160 MHZ BANDWIDTH SUPPORTED WIRELESS DATA COMMUNICATION NETWORKS

FIELD OF THE INVENTION

The invention relates generally to computer networking, and more specifically, to using artificial intelligence for dynamically steering stations with 160 MHz bandwidth to best available channel on Wi-Fi based on bandwidth.

BACKGROUND

The latest WLAN (wireless local access network) standard promulgated by the Institute for Electronic and Electrical Engineers, IEEE 802.11AX (also known as Wi-Fi 6 and HEW, High-Efficiency Wireless), provides 160 MHz channel bandwidth for high throughput wireless stations using 1024 QAM (quadrature amplitude modulation) enabled transmissions, with low latency in dense environments. This high throughput technology taps into the full power of 5 GHz devices to support 4k video, gaming, and other stresses on network bandwidth. But only two operational channels are available with 160 MHz bandwidth capacity, channels 36 through 64 and channels 100 through 128. Under 36/160 MHz bandwidth, channels 52 to 64 (i.e., 5250 MHz to 5330 MHz), and under 100/160 MHz (i.e., 5490 MHz to 5730 MHz) are all DFS enabled.

Further to the limited channel availability, devices operating in 5 GHz spectrum need to co-exist with radar signaling systems. As WLAN devices share the spectrum with devices which generate radar signals, interruption in WLAN data communications can be caused when radar energy is detected over the same frequency.

When a WLAN access point operating with 160 MHz bandwidth is affected by radar energy, it has to move out of the current operating channel and choose a new operating channel. The current DFS technology allows WLAN devices to co-exist with radar. To this end, the interrupted channel has an NOP (non occupancy period) set for a range of 30 minutes to 24 hours of maximum value, depending on the nature of radar interruption, during which the access point does not use the channel. The new operating channel can be either 160 MHz, if available, or a reduced bandwidth of 80 MHz, 40 MHz or 20 MHz, for a duration of NOP. As a result, station performance is debilitated during NOP periods. Problematically, only shuts down the channel and downgrades station bandwidth as needed. Current DFS provides no logic or intelligence for providing stations with maximum available bandwidth capacity.

Therefore, what is needed is a robust technique for using artificial intelligence to dynamically steer stations with 160 MHz bandwidth based on bandwidth.

SUMMARY

These shortcomings are addressed by the present disclosure of methods, computer program products, and systems for using artificial intelligence for dynamically steering stations with 160 MHz bandwidth, based on bandwidth availability and capability.

In one embodiment, at least one 160 MHz station at a first access point of the plurality of access points is downgraded in response to being changed off of an NOP (non occupancy period), wherein no other 160 MHz channel is currently available at the first access point. A change in 160 MHz bandwidth availability is detected within the plurality of access points of the WLAN. The detected change comprises at least one 160 MHz channel becoming available.

In another embodiment, responsive to detecting the change, specific frequency channels are assigned from one of within range with priority based on bandwidth. This includes assigning the 160 MHz stations to available 160 MHz channels, next assigning any remaining of the 160 MHz stations to the available 80 MHz channels, and then assigning the 80 MHz stations to available 80 MHz channels. The algorithm can continue through 40 MHz and 20 MHz stations.

In yet another embodiment, the at least one 160 MHz station is steered from the first access point having no available 160 MHz channels to a second access point having at least one available 160 MHz channel.

Advantageously, network performance is improved with higher bandwidth connections for stations. The adverse effects of radars on 5 GHz devices is reduced.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for using artificial intelligence for dynamically steering stations with 160 MHz bandwidth based on bandwidth. One of ordinary skill in the art will recognize many additional variations made possible by the succinct description of techniques below. For example, although Wi-Fi referred to throughout this document, the same principles can be extended to Bluetooth or hybrid wireless data communication channels.

I. Systems for Artificially Intelligent Frequency Channel Selection (FIG. 1-2)

Figure 1A:
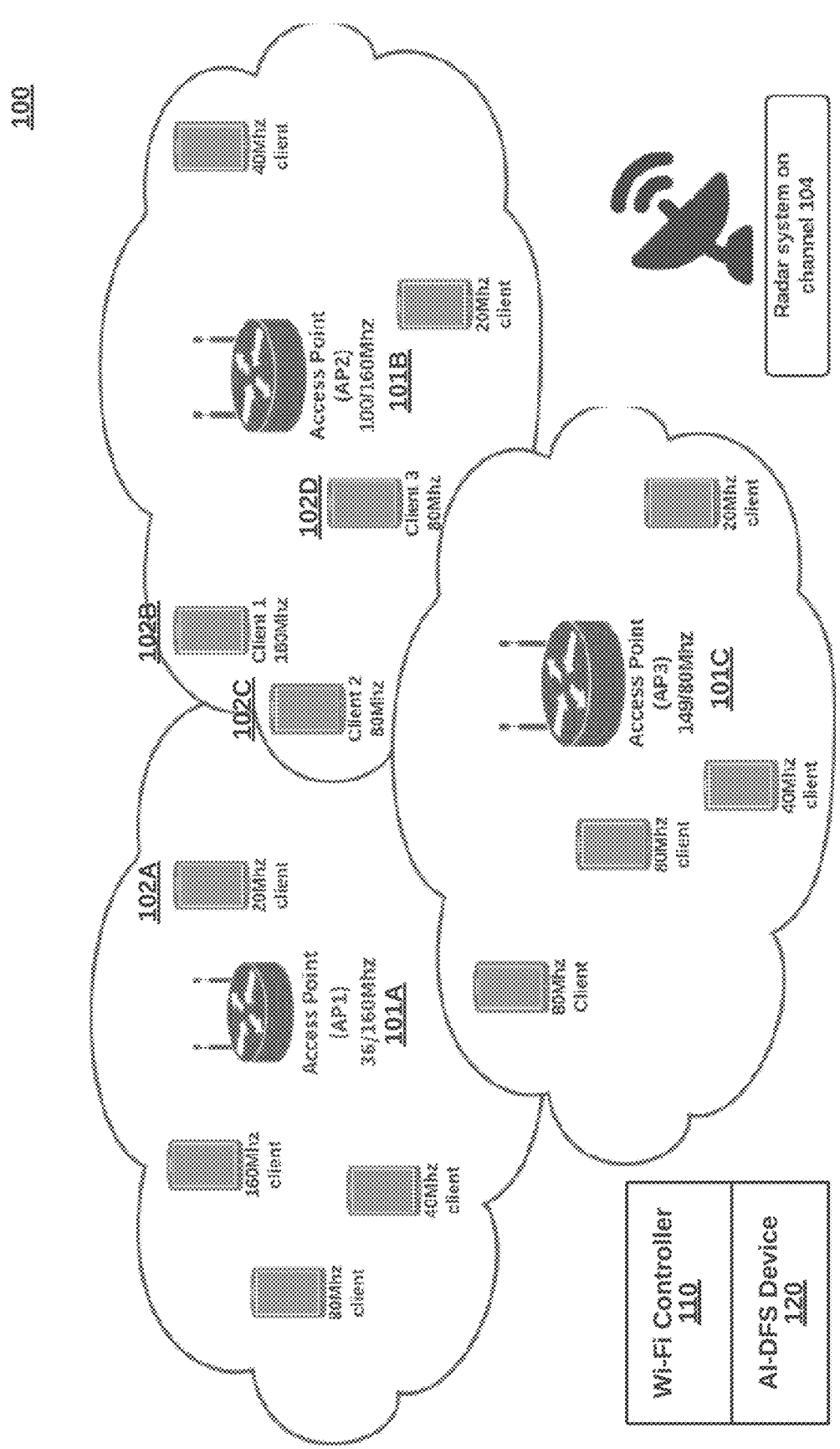
FIGS. 1A,1B,1C are high-level block diagrams illustrating a system for using artificial intelligence for dynamically steering stations with 160 MHz bandwidth based on bandwidth, over different snapshots in time, according to one embodiment.
Figure 1B:
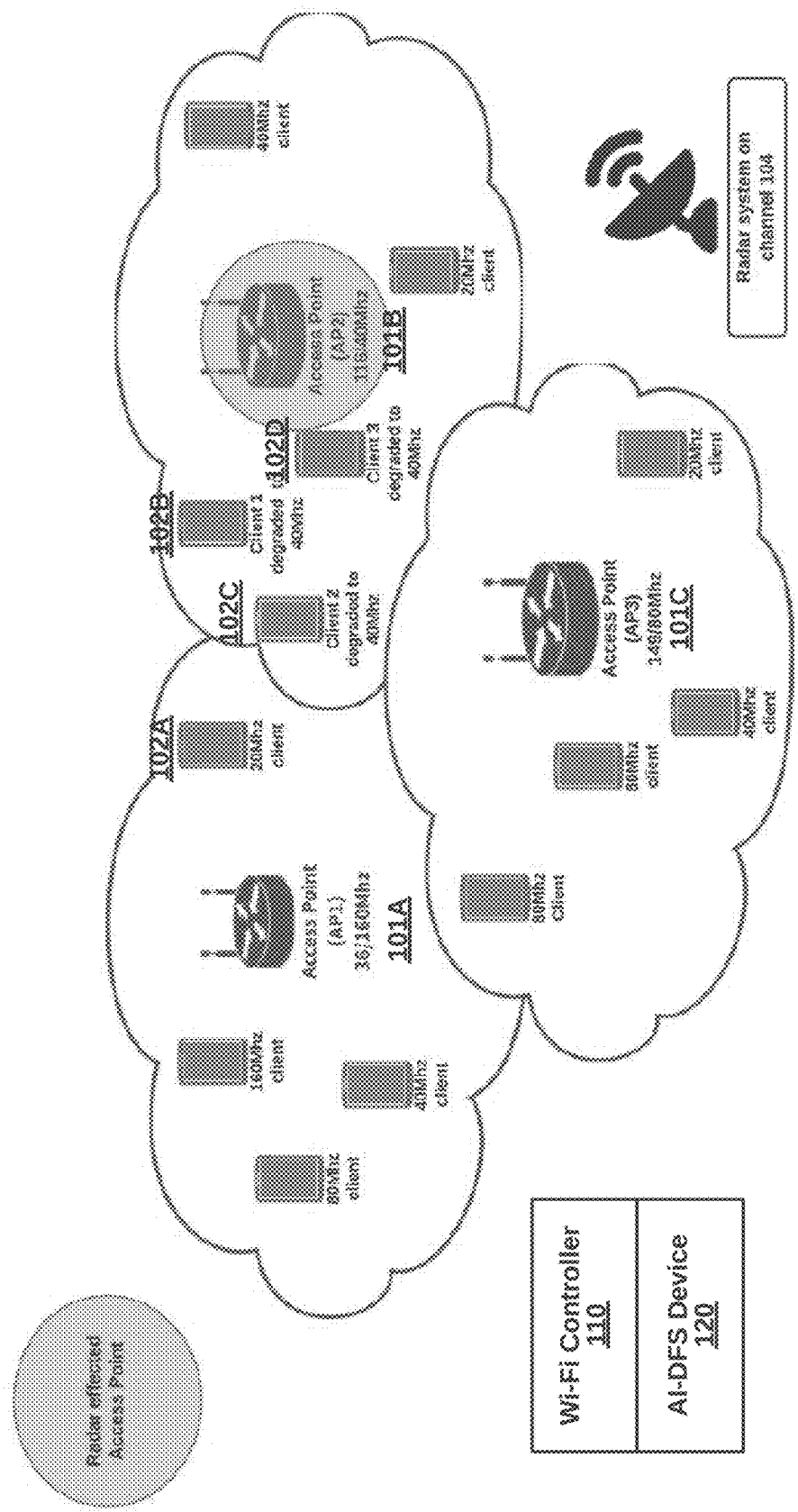
Figure 1C:
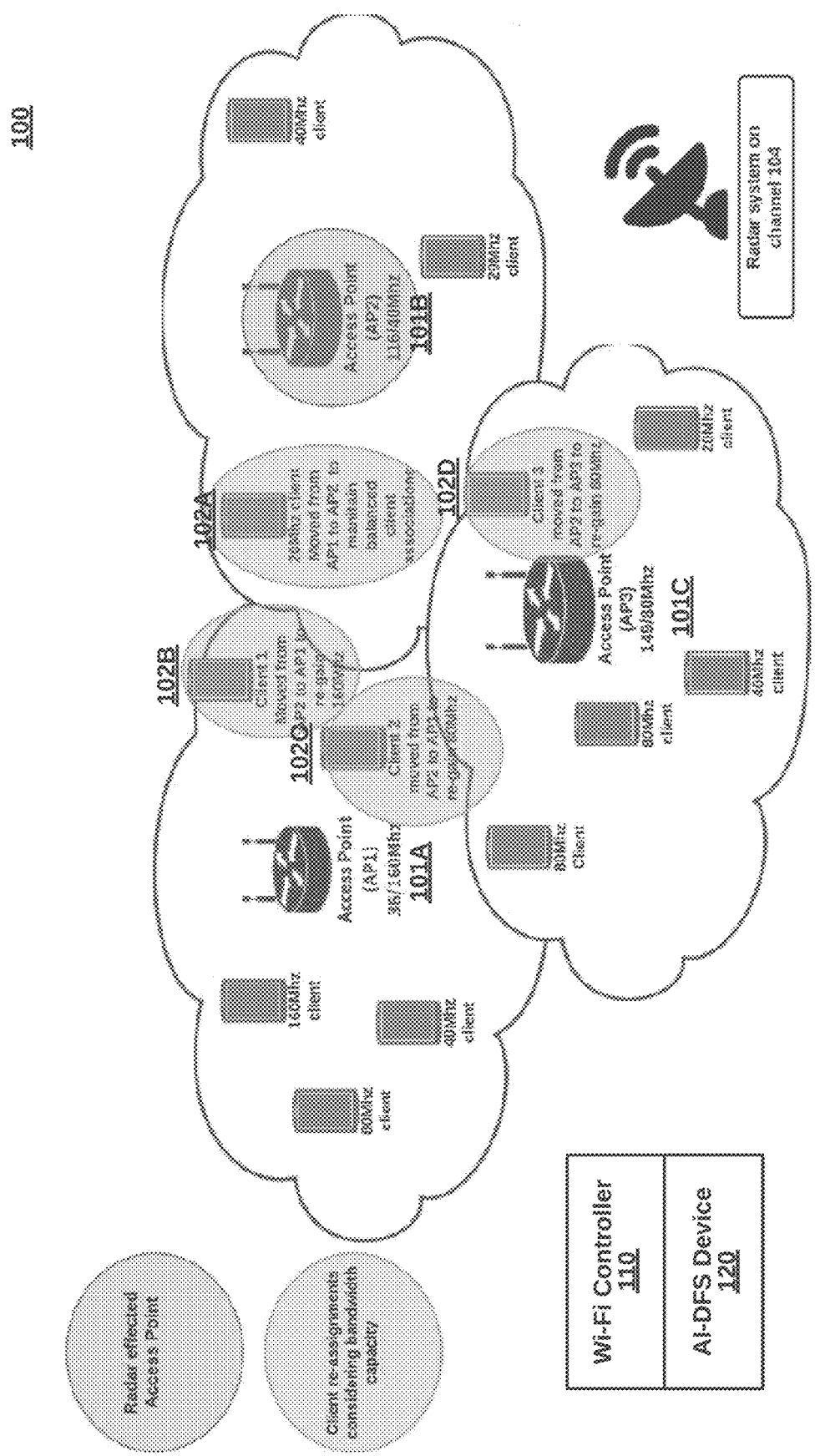
Figure 2:
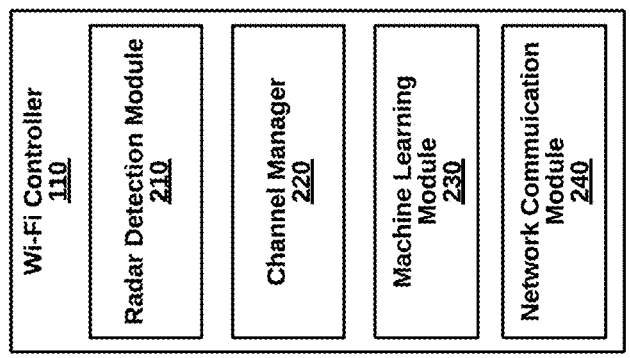
FIG. 2 is a more detailed block diagram illustrating an access point of the system of FIG. 1, respectively, according to one embodiment.

FIGS. 1A-1C are high-level block diagrams illustrating a system 100 for using artificial intelligence to dynamically steer stations with 160 MHz bandwidth based on bandwidth, according to one embodiment. The system 100 includes a Wi-Fi controller 110, an AI-DFS device 120, access points 101A-C, and stations, coupled through a wide area network. Many other embodiments are possible, for example, with more access points, more or fewer stations, additional components, such as firewalls, routers, switches, and the like.

Figure 4:
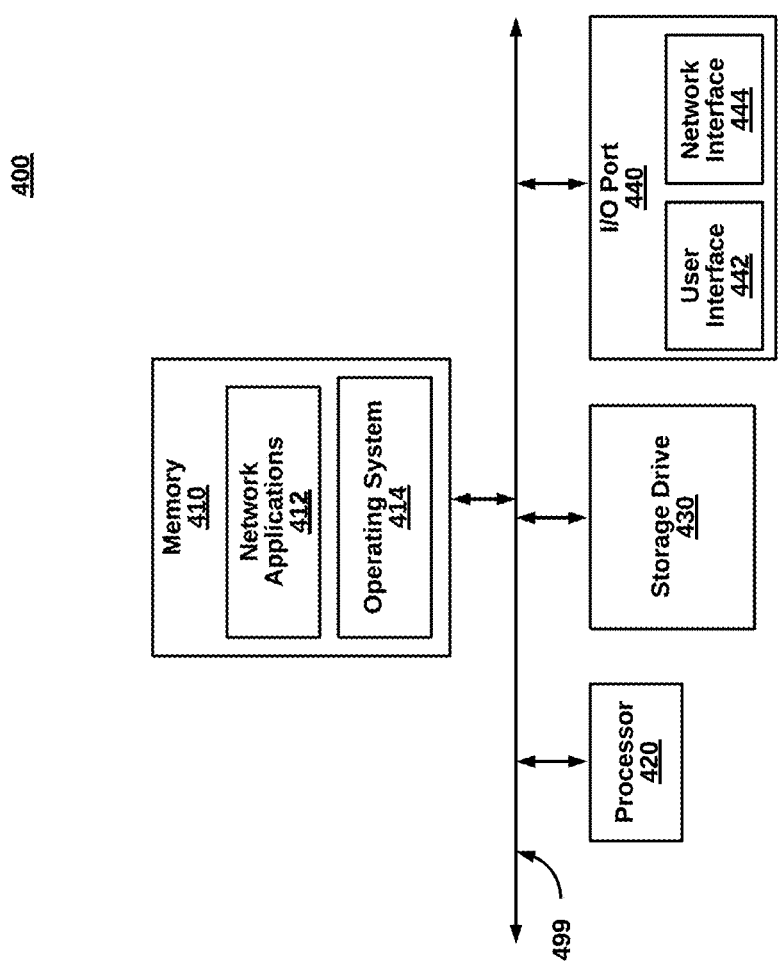
FIG. 4 is a block diagram illustrating an example computing device, according to one embodiment.

Hardware and software components can be implemented similar to the example of FIG. 4.

The wide area network links components of the system 100 with a channel for data communication. The Wi-Fi controller 110, the AI-DFS device 120, and the access point 101A-C are preferably connected to the wide area network via hardwire. The stations 102A-D are wirelessly connected to the access points 101A-C to access the wide area network indirectly. The wide area network can be a data communication network such as the Internet, a WAN, a LAN, WLAN, can be a cellular network (e.g., 3G, 4G or 5G), or a hybrid of different types of networks. Thus, the system 100 can be a LAN or include cloud-based devices. The radar system 104 is connected by physical interference on Wi-Fi communication channels, but is not directly in data communications with the Wi-Fi network (although there may be some control signals sent over NOP channels).

In one embodiment, the Wi-Fi controller 110 distributes stations 102A-D among access points 101A-C with logic taking bandwidth capability of both stations and access points into consideration (e.g., see FIG. 1C). In another embodiment, downgraded 160 MHz stations are operating on a first access point at 40 MHz (e.g., see 102B, 102C, 102D in FIG. 1B), so the Wi-Fi controller 110 steers the downgraded 160 MHz station to a second access point that has available 160 MHz channel and bandwidth is no longer downgraded (e.g., 102B. In yet another embodiment, a change in bandwidth channel availability is detected by the AI-DFS 120 through information shared with the Wi-Fi controller 110. As shown in FIGS. 1A,1B and 1C in succession, stations can be rearranged to different access points based on the bandwidth capabilities of the stations and access points after downgrades. In one embodiment, the Wi-Fi controller tracks updates in status for the NOP channels, to detect available bandwidth. In another embodiment, a second access point can use this information during channel selection.

An access point manager of one embodiment of the Wi-Fi controller 110 manages the access points 101A-C and indirectly manages connected stations 102A-D, with respect to network access and type of access, in an embodiment. SSIDs (service set identifiers) can be assigned to and unassigned from an access point. Additionally, when stations are handed-off from one access point to another access point, the SSID can follow the station to different access points, for example, as implemented in the virtual port feature by Fortinet, Inc. of Sunnyvale, Calif. When stations change access points, the access point manager can keep connection parameters and security consistent. Thus, the access point manager can compel station configurations and behaviors that may not occur naturally, rather than allowing stations to choose access points as they usually do under IEEE 802.11 standards.

The AI-DFS device 120 can be integrated into the Wi-Fi controller 110, in an embodiment. The AI-DFS 120 device can also be a separate server, in other embodiments. One benefit of the integrated embodiment is direct access to network information, rather than over a network and through security. The AI-DFS device 120 assigns stations to access points, based on a match in bandwidth capability. The assignments can be responsive to radar system on channel 104 detecting a satellite signal, causing an NOP channel and displacement of high bandwidths. In some embodiments, 160 MHz devices are first matched for network availability, 80 MHz devices are secondly matched for network availability, then 40 MHz devices, and if need be, lastly 20 MHz devices. Many variations are possible, a single example is given only for conciseness. More details for the AI-DFS device 120 are set forth below with respect to FIG. 2.

The access points 101A-C provide channels of various bandwidths for stations to join for access to the Internet (see, e.g., FIG. 1A). The 160 MHz bandwidth channels can operate under IEEE 802.11, or more specifically IEEE 802.11AX (or Wi-Fi 6), over allowed frequencies. The access points 101A-C can also have combinations of 80 MHz, 40 MHz and 20 MHz bandwidth channels available for stations. Two 80 MHz channels can be combined to provide a 160 MHz channel, albeit with additional overhead and processor hardware. In one example, the access points 101A-C are hardware built for beamforming for bi-directional MU-MIMO (multiple-user, multiple input, multiple output) with multiple antennae in, for example, 2×2, 3×3, 4×4 or 8×8 stream variations. Different modulation schemes can be implemented, such as QAM and OFDMA (orthogonal frequency division multiple access). Downshifting from 5 GHz to 2.4 GHz can occur if necessary.

The access points 101A-C can change modes from servicing stations to detecting radar, periodically. In more detail, the access points 101A-D can use several virtual access points logically separated (e.g., by dedicated software virtual machines and/or dedicated hardware processor cores) to host several SSIDs rather than just one SSID. This allows each device to set up a virtual access point designated for radar detection with an SSID exclusively for radar detection.

The stations 102A-D are preferably enabled for 160 MHz channel bandwidth with an appropriate Wi-Fi processor and are able to downgrade when the maximum bandwidth is not available. The stations 102A-D can also be enabled for 80 MHz, 40 MHz or 20 MHz channel bandwidths. In one example, the stations 102A-D include MU-MIMO capable for dense environments. Transceivers of the stations 102A-D send a probe request to join a Wi-Fi network and receive available SSIDs. The stations 102A-D can be unaware of transparent reconfigurations upstream on the network, as to which access point is servicing a particular station. Any designated access point within range can respond to a particular stations and other access points can ignore the particular stations (e.g., by MAC address). One embodiment of the stations 120A-D includes channel bandwidth switchers. The mechanism can reconfigure a station for a channel bandwidth provided by the network.

The network components of the system 100 can implemented in any of the computing devices discussed herein, for example, a personal computer, a laptop computer, a tablet computer, a smart phone, a smart watch, a mobile computing device, a server, a cloud-based device, a virtual device, an Internet appliance, an IoT (Internet of things) device, or any of the computing devices described herein, using hardware and/or software (see e.g., FIG. 4).

FIG. 2 is a more detailed block diagram illustrating the AI-DFS device 120 of the system of FIG. 1, respectively, according to one embodiment. The Wi-Fi controller 110 comprises a radar detection module 210, a channel manager 220, a machine learning module 230, and a network communication module 240. The components can be implemented in hardware, software, or a combination of both.

The radar detection module 210 includes a hardware sensor to detect wireless radar signals from other external sources which share the same frequency as Wi-Fi. For example, satellite communications may interfere with 5 GHz smartphones on certain channels of an access point. If the radar signal exceeds a magnitude threshold, in some embodiments, it causes a change in status of a channel to NOP making the channel out of use for some period of time.

One implementation requires monitoring of a channel for radar for 60 seconds before channel use, and requires discontinuation of channel use within 10 seconds after radar detection. Another embodiment uses a dedicated WLAN module for radar detection.

The channel manager 220 sets the period of non-use can be, for example, 1 minute or 5 minutes, or even 24 hours. If a 160 MHz channel is taken offline, there may be no available 160 MHz channels available for the stations that are displaced. After expiration, the status can be changed away from NOP. In one embodiment, a tester checks channels coming off NOP for the same interference or disturbance that initially caused the NOP. Stations can again use the channel after the tester indicates a clear channel.

The machine learning module 230 reassigns stations to recover lost bandwidth, on one embodiment. In doing so, real-time conditions are use against statistical models to determine the best arrangement. Adaptations are made based on feedback from actual connections by stations. Network statistics can be stored for training models for the machine learning module 230.

The network communication module 240 can provide network protocol services and lower layer services for packetizing data according to Ethernet or other protocols. The network communication module 240 can include transceivers with modulators, antennae and drivers to exchange data with a physical medium. An operating system can interface applications executing on stations with network services.

II. Methods for Artificially Intelligent Frequency Channel Selection (FIG. 3)

Figure 3:
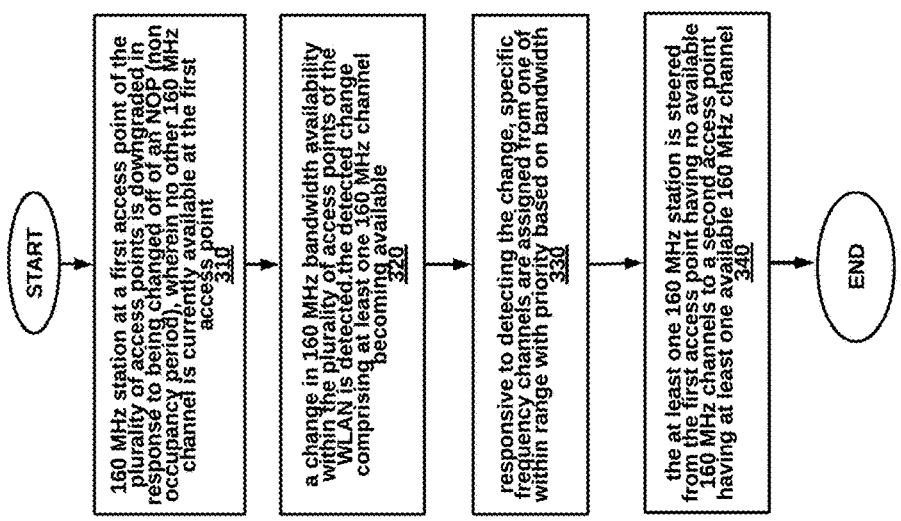
FIG. 3 is a high-level flow diagram illustrating a method for using artificial intelligence for dynamically steering stations with 160 MHz bandwidth based on bandwidth, according to one embodiment.

FIG. 3 is a high-level flow diagram illustrating a method for using artificial intelligence for dynamically steering stations with 160 MHz bandwidth based on bandwidth, according to one embodiment. The method 300 can be implemented, for example, by the system 100 of FIG. 1. The steps are merely representative groupings of functionality, as there can be more or fewer steps, and the steps can be performed in different orders. Many other variations of the method 300 are possible.

At step 310, at least one 160 MHz station at a first access point of the plurality of access points is downgraded in response to being changed off of an NOP, wherein no other 160 MHz channel is currently available at the first access point.

At step 320, a change in 160 MHz bandwidth availability within the plurality of access points of the WLAN is detected. the detected change comprising at least one 160 MHz channel becoming available.

At step 330, responsive to detecting the change, specific frequency channels are assigned from one of within range with priority based on bandwidth. One embodiment comprises assigning the 160 MHz stations to available 160 MHz channels, next assigning any remaining of the 160 MHz stations to the available 80 MHz channels, and then assigning the 80 MHz stations to available 80 MHz channels.

At step 340, the at least one 160 MHz station is steered from the first access point having no available 160 MHz channels to a second access point having at least one available 160 MHz channel.

III. Generic Computing Device (FIG. 4)

FIG. 4 is a block diagram illustrating an example computing device 400 for use in the system 100 of FIG. 1, according to one embodiment. The computing device 400 is implementable for each of the components of the system 100. The computing device 400 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 400, of the present embodiment, includes a memory 410, a processor 420, a storage drive 430, and an I/O port 440. Each of the components is coupled for electronic communication via a bus 499. Communication can be digital and/or analog, and use any suitable protocol.

The memory 410 further comprises network applications 412 and an operating system 414. The network applications 412 can include a web browser, a mobile application, an application that uses networking, a remote application executing locally, a network protocol application, a network management application, a network routing application, or the like.

The operating system 414 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 420 can be a network processor (e.g., optimized for IEEE 802.11, IEEE 802.11AC or IEEE 802.11AX), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 420 can be single core, multiple core, or include more than one processing elements. The processor 420 can be disposed on silicon or any other suitable material. The processor 420 can receive and execute instructions and data stored in the memory 410 or the storage drive 430

The storage drive 430 can be any non-volatile type of storage such as a magnetic disc, EEPROM (electronically erasable programmable read-only memory), Flash, or the like. The storage drive 430 stores code and data for applications.

The I/O port 440 further comprises a user interface 442 and a network interface 444. The user interface 442 can output to a display device and receive input from, for example, a keyboard. The network interface 444 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in a Wi-Fi controller coupled to a plurality of access points on a data communication network, for artificially intelligent dynamic frequency selection (AI-DFS) for downgraded 160 MHz stations, the method comprising the steps of:
   downgrading at least one 160 MHz station at a first access point of the plurality of access points in response to being changed off of an NOP (non occupancy period), wherein no other 160 MHz channel is currently available at the first access point;
   detecting a change in 160 MHz bandwidth availability within the plurality of access points of the WLAN, the detected change comprising at least one 160 MHz channel becoming available;
   responsive to detecting the change, assigning specific frequency channels from one of within range with priority based on bandwidth, including: assigning the 160 MHz stations to available 160 MHz channels, next assigning any remaining of the 160 MHz stations to the available 80 MHz channels, and then assigning the 80 MHz stations to available 80 MHz channels,
   wherein the assigning includes steering the at least one 160 MHz station from the first access point having no available 160 MHz channels to a second access point having at least one available 160 MHz channel.

2. The method of claim 1, wherein the assigning includes: assigning the 80 MHz stations to available 80 MHz channels, next assigning any remaining of the 80 MHz stations to the available 40 MHz channels, and then assigning the 40 MHz stations to available 40 MHz channels.

3. The method of claim 1, further comprising:
   detecting a change in 80 MHz bandwidth availability within the plurality of access points of the WLAN, the detected change comprising at least one 80 MHz channel on the plurality of access points becoming available.

4. The method of claim 1, wherein the NOP channel comprises unlicensed frequencies ranging from 5250 MHz to 5330 MHz and 5490 MHz to 5730 MHz, per IEEE 802.11 standards.

5. The method of claim 1, wherein the WLAN is capable of communications compliant with IEEE 802.11AX.

6. The method of claim 1, wherein the WLAN operates under channels 36 through 64 and channels 100 through 128, as DFS enabled.

7. The method of claim 1, further comprising:
   detecting ambient radar on a radar signaling systems channel; and
   responsive to the ambient radar detection, enabling the NOP for a certain time period.

8. The method of claim 7, further comprising:
   detecting more ambient radar on the radar signaling systems channel; and
   responsive to the additional ambient radar detection, increasing the NOP for a certain time period beyond a linear increase.

9. A non-transitory computer-readable media storing source code that, when executed by a processor, performs a computer-implemented method, in an access point on a data communication network and implemented at least partially in hardware, for artificially intelligent dynamic frequency selection (AI-DFS) for downgraded 160 MHz stations, the method comprising the steps of:
   downgrading at least one 160 MHz station at a first access point of the plurality of access points in response to being changed off of an NOP channel due to ambient radar, wherein no other 160 MHz channel is currently available at the first access point;
   detecting a change in 160 MHz bandwidth availability within the plurality of access points of the WLAN, the detected change comprising at least one 160 MHz channel becoming available;
   responsive to detecting the change, assigning specific frequency channels from one of within range with priority based on bandwidth, including: assigning the 160 MHz stations to available 160 MHz channels, next assigning any remaining of the 160 MHz stations to the available 80 MHz channels, and then assigning the 80 MHz stations to available 80 MHz channels,
   wherein the assigning includes steering the at least one 160 MHz station from the first access point having no available 160 MHz channels to a second access point having at least one available 160 MHz channel.

10. A system comprising a Wi-Fi controller coupled to a plurality of access points on a data communication network, for artificially intelligent dynamic frequency selection (AI-DFS) for downgraded 160 MHz stations, the Wi-Fi comprising:
   a processor;
   a communication interface; and
   a storage device, comprising:
      a channel manager to downgrade at least one 160 MHz station at a first access point of the plurality of access points in response to being changed off of an NOP (non occupancy period), wherein no other 160 MHz channel is currently available at the first access point, wherein the channel manager detects a change in 160 MHz bandwidth availability within the plurality of access points of the WLAN, the detected change comprising at least one 160 MHz channel becoming available, wherein responsive to detecting the change, the channel manager assigns specific frequency channels from one of within range with priority based on bandwidth, including: assigning the 160 MHz stations to available 160 MHz channels, next assigning any remaining of the 160 MHz stations to the available 80 MHz channels, and then assigning the 80 MHz stations to available 80 MHz channels, and wherein the assigning includes steering the at least one 160 MHz station from the first access point having no available 160 MHz channels to a second access point having at least one available 160 MHz channel.

* * * * *